US007856634B2

(12) United States Patent
Satou et al.

(10) Patent No.: US 7,856,634 B2
(45) Date of Patent: Dec. 21, 2010

(54) LOAD DISTRIBUTION SYSTEM, AND EVENT PROCESSING DISTRIBUTION CONTROL APPARATUS, AND AN EVENT PROCESSING DISTRIBUTION CONTROL PROGRAM

(75) Inventors: Tadashi Satou, Tokyo (JP); Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 281 days.

(21) Appl. No.: 11/389,251

(22) Filed: Mar. 27, 2006

(65) Prior Publication Data

US 2006/0230077 A1  Oct. 12, 2006

(30) Foreign Application Priority Data

Mar. 28, 2005  (JP)  ............................. 2005-092080
Oct. 28, 2005  (JP)  ............................. 2005-314537

(51) Int. Cl.
*G06F 9/46*  (2006.01)
*G06F 9/455*  (2006.01)
(52) U.S. Cl. ........................... 718/105; 710/17; 710/18; 707/636
(58) Field of Classification Search ................. 707/200, 707/636; 709/223, 226, 238, 241, 244; 718/105; 710/15–19; 711/133–136; 715/804, 805
See application file for complete search history.

(56) References Cited

U.S. PATENT DOCUMENTS

| 5,452,350 | A | * | 9/1995 | Reynolds et al. | ........ 379/221.07 |
| 5,938,732 | A | * | 8/1999 | Lim et al. | .................... 709/229 |
| 5,963,746 | A | * | 10/1999 | Barker et al. | ................. 712/20 |
| 6,044,367 | A | * | 3/2000 | Wolff | ............................. 707/2 |
| 6,393,458 | B1 | * | 5/2002 | Gigliotti et al. | ............. 709/203 |
| 6,578,068 | B1 | * | 6/2003 | Bowman-Amuah | ......... 709/203 |
| 6,681,251 | B1 | * | 1/2004 | Leymann et al. | ............ 709/226 |

(Continued)

FOREIGN PATENT DOCUMENTS

JP  11250020 A  9/1999

(Continued)

OTHER PUBLICATIONS

Nikkei Internet Technology, Nikkei Business Publications, Inc., Nov. 22, 2001, pp. 22-27.

(Continued)

*Primary Examiner*—Greta L Robinson
*Assistant Examiner*—Dennis Truong
(74) *Attorney, Agent, or Firm*—Sughrue Mion, PLLC

(57) ABSTRACT

In a load distribution system, a plurality of processing servers are installed and a context-dependent distributor is arranged in a stage before the processing servers such that a distribution rule is set to the distributor to appropriately distribute an event to an associated processing server, the event being necessary for the server to execute a processing rule set thereto. To achieve the processing distribution in a system of this type, a plurality of processing servers are disposed and an event processing distribution control unit sets event processing rules to the respective processing servers for individual applications. The distribution controller sets a distribution rule associated with context of an event to a distributor so that the event is distributed to an associated server beforehand designated to process the event. This makes it possible to accomplish load distribution for the processing servers.

25 Claims, 13 Drawing Sheets

U.S. PATENT DOCUMENTS

| | | | |
|---|---|---|---|
| 6,886,035 B2 * | 4/2005 | Wolff | 709/219 |
| 6,922,832 B2 * | 7/2005 | Barnett et al. | 718/1 |
| 6,938,256 B2 * | 8/2005 | Deng et al. | 718/104 |
| 2004/0162807 A1 * | 8/2004 | Montagne | 707/1 |
| 2005/0108718 A1 * | 5/2005 | Kumar et al. | 718/102 |
| 2005/0111367 A1 * | 5/2005 | Chao et al. | 370/235 |
| 2005/0185646 A1 * | 8/2005 | Karino et al. | 370/389 |

FOREIGN PATENT DOCUMENTS

| | | |
|---|---|---|
| JP | 2000-222374 A | 8/2000 |
| JP | 2001-117897 A | 4/2001 |
| JP | 2002-335268 A | 11/2002 |
| JP | 2004-5249 A | 1/2004 |

OTHER PUBLICATIONS

Nikkei Open Systems, Nikkei Business Publications Inc., Dec. 15, 1999, pp. 128-131.

* cited by examiner

FIG. 8

```
0001  Rule_A_name="Rule_A-n"
0002  Event_condition=(tag_kind=4)
0003  Action={
0004      initial{
0005          dim eventlog[10] ,event_count
0006          event_count=0
0007      }
0008      receive(event){
0009              eventlog[event_count]=event
0010              event_count=event_count+1
0011              If event_count>=10(
0012                  send_eventlog(eventlog,10)
0013                  event_count=0
0014                  clear_timer()
0015              else{
0016                  set_timer(10,timeout) /*sec*/
0017              }
0018      }
0019      timeout{
0020              send_eventlog(eventlog,eventcount)
0021              event_count=0
0022              clear_timer()
0023      }
0024  }
```

FIG. 9

| PROCESSING SERVER ID | NO. OF PROCESSING RULES | RULE NAME 1 | EVENT CONDITION 1 | RULE NAME 2 | EVENT CONDITION 2 | RULE NAME 3 | EVENT CONDITION 3 | RULE NAME 4 | EVENT CONDITION 4 |
|---|---|---|---|---|---|---|---|---|---|
| EP1 | 2 | rule1 | tag_kind=1 | rule2 | tag_kind=3 | | | | |
| EP2 | 2 | rule3 | tag_kind=2 | rule4 | tag_kind=5 | | | | |
| EP3 | 3 | rule5 | tag_kind=3 | rule6 | tag_kind=3 | rule7 | tag_kind=3 | | |
| EP4 | 4 | rule8 | tag_kind=4 | rule9 | tag_kind=4 | rule10 | tag_kind=4 | rule11 | tag_kind=4 |
| EP5 | 3 | rule12 | tag_kind=5 or tag_kind=7 | rule13 | tag_kind=5 | rule14 | tag_kind=5 | | |
| EP6 | 4 | rule15 | tag_kind=6 | rule16 | tag_kind=6 | rule17 | tag_kind=6 | rule18 | tag_kind=6 |

FIG. 12

Event(TagID=10, ReaderID=20)

FIG. 13

|  | PROCESSING SERVER 1 | PROCESSING SERVER 2 | PROCESSING SERVER 3 |
|---|---|---|---|
| RULES TO BE ASSIGNED | Rule_A3 | Rule_A1<br>Rule_A2<br>Rule_A4 | Rule_A5<br>Rule_A6 |

FIG. 14

Rule_A1(Event(TagID=10, ReaderID=20) & Event(TagID=11, ReaderID=20), notify TO Application-A)
Rule_A2(Event(TagID=10, ReaderID=20) & Event(TagID=11, ReaderID=20), notify TO Application-B)
Rule_A3(Event(TagID=11, ReaderID=21) & Event(TagID=12, ReaderID=22), notify TO Application-C)
Rule_A4(Event(TagID=11, ReaderID=20) & Event(TagID=13, ReaderID=25), notify TO Application-C)
Rule_A5(Event(TagID=14, ReaderID=20) & Event(TagID=15, ReaderID=21), notify TO Application-A)
Rule_A6(Event(TagID=13, ReaderID=25) & Event(TagID=14, ReaderID=20), notify TO Application-B)

FIG. 15

| EVENT TO BE TRANSFERRED | PROCESSING SERVER AS TRANSFER DESTINATION |
|---|---|
| Event (TagID=10, ReaderID=20) | EP2 |
| Event (TagID=11, ReaderID=20) | EP2 |
| Event (TagID=11, ReaderID=21) | EP1 |
| Event (TagID=12, ReaderID=22) | EP1 |
| Event (TagID=13, ReaderID=25) | EP2, EP3 |
| Event (TagID=14, ReaderID=20) | EP3 |
| Event (TagID=15 ReaderID=21) | EP3 |

FIG. 16

| | PROCESSING SERVER 1 | PROCESSING SERVER 2 | PROCESSING SERVER 3 |
|---|---|---|---|
| RULES TO BE ASSIGNED | Rule_A4 | Rule_A1<br>Rule_A2<br>Rule_A3 | Rule_A5<br>Rule_A6 |

FIG. 17

| EVENT TO BE TRANSFERRED | PROCESSING SERVER AS TRANSFER DESTINATION |
|---|---|
| Event (TagID=10, ReaderID=*) | EP2 |
| Event (TagID=11, ReaderID=*) | EP1, EP2 |
| Event (TagID=12, ReaderID=*) | EP2 |
| Event (TagID=13, ReaderID=*) | EP1, EP3 |
| Event (TagID=14, ReaderID=*) | EP3 |
| Event (TagID=15, ReaderID=*) | EP3 |

LOAD DISTRIBUTION SYSTEM, AND EVENT PROCESSING DISTRIBUTION CONTROL APPARATUS, AND AN EVENT PROCESSING DISTRIBUTION CONTROL PROGRAM

BACKGROUND OF THE INVENTION

1. Field of the Invention

The present invention relates to a load distribution system to implement load distribution for a plurality of processing servers.

2. Description of the Related Art

In a conventional system to process events occurring from devices, one processing server 504 executes the event processing as shown in FIG. 1. In the system, as the number of events 511*a* to 511 *f* increases, the server 504 becomes a bottleneck of the processing. This leads to a problem of limiting system processing performance.

In a load distribution method shown in FIG. 2 based on a server and client method such as a method used in a Web service, servers 606*a* and 606*b* respectively include application programs 608*a* and 608*b* which are substantially equal to each other. In this system, referring to a Transmission Control Protocol (TCP) connection or cookie, a session from the same client (605*a* to 605*f*) is transferred to the same sever (606*a*, 606*b*).

Japanese Patent Application Laid-Open No. 2000-222374 describes a technique to determine, in response to a response from a packet processor, one of the packet processors to which a packet dispersion controller issues a processing request.

According to Japanese Patent Application Laid-Open No. 2004-005249, a distribution program is installed in processors such that processing is transferred between processors on the basis of a control channel number or a terminal number.

SUMMARY OF THE INVENTION

It is therefore an object of the present invention, which has been devised to solve the problem, to provide a load distribution system in which a plurality of processing servers are installed and a context-dependent distributor 103 is arranged in a stage preceding the processing servers. A distribution rule is set to the distributor 103 to appropriately distribute an event to an associated processing server, the event being necessary for the server to execute a processing rule set thereto.

To achieve the object in accordance with a first aspect of the present invention, there is provided a load distribution system including a plurality of processing servers for notifying a result of processing of an event to a plurality of applications, a context-dependent distributing unit for distributing events occurring in terminals to the plural processing servers, and an event processing distribution control unit for individually setting processing rules to the plural processing servers and setting a distribution rule to the context-dependent distributing unit, the distributing unit thereby appropriately distributing events required to execute the processing rules. The event processing distribution control unit sets the processing rule of the event processing required by an application to the associated processing server. The event processing distribution control unit sets a distribution rule to context-dependent distributing unit. The event is appropriately distributed to the associated processing server according to the processing rule.

According to a second aspect of the present invention, the load distribution system further includes a context-independent distributing unit for randomly distributing events occurring in the terminals to the context-dependent distributing unit. The context-independent distributing unit distributes the events to the context-dependent distributing unit without referring to context of the events.

In the load distribution system according to a third aspect of the present invention, each of the terminals includes a distribution rule set by the event processing distribution control unit. The terminal distributes events occurring therein to the processing servers according to the distribution rule.

According to a fourth aspect of the present invention, the load distribution system includes a plurality sets of the context-independent distributing units of which at least one context-independent distributing unit conducting event distribution to distribute events. The context-independent distributing units mutually confirm failure of each other. The context-independent distributing unit conducting the event distribution is replaced, if failure is detected therein, by another context-independent distributing unit.

According to a fifth aspect of the present invention, the load distribution system includes a plurality of sets of the context-dependent distributing units. The context-dependent distributing units mutually confirm failure of each other.

In the load distribution system according to a sixth aspect of the present invention, by notifying confirmation of failure to context-independent distributing units, the context-independent distributing units do not distribute an event to the context-independent distributing unit in which failure has occurred.

In the load distribution system according to a seventh aspect of the present invention, the event processing distribution control unit includes a processing rule distribution recording unit for recording, for each of the processing servers, an event condition contained at least in the processing rule among those distributed as above. The event processing distribution control unit refers to the processing rule distribution recording unit at reception of a new processing rule, and assigns the new processing rule to one of the processing servers which is assigned with processing rules and of which the number of processing rules is within a predetermined range relative to a minimum value of the numbers of the processing rules respectively assigned to the processing servers, the processing server having an event condition substantially equal to an event condition of the new processing rule.

In the load distribution system according to an eighth aspect of the present invention, in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

In the load distribution system according to a ninth aspect of the present invention, in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

The load distribution system according to a tenth aspect of the present invention further includes weight coefficients for each of the processing rules. The event processing distribution control unit includes a processing rule distribution recording unit for recording, for each of the processing servers, an event condition contained at least in the processing rule among those distributed above. The event processing distribution control unit refers to the processing rule distribution recording unit at reception of a new processing rule, and assigns the new processing rule to one of the processing servers which is assigned with processing rules and of which a sum of the weight coefficient is within a predetermined range relative to a minimum value of the sums of the weight coefficients of the numbers of the processing rules respectively assigned to the processing servers, the processing server having an event condition substantially equal to an event condition of the new processing rule.

In the load distribution system according to an 11th aspect of the present invention, in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

According to the load distribution system of a 12th aspect of the present invention, in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

In accordance with a 13th aspect of the present invention, there is provided an event processing distribution control apparatus for use in a load distribution system including a plurality of processing servers for notifying a result of processing of an event to a plurality of applications and a context-dependent distributing unit for distributing events occurring in terminals to the plural processing servers. The control apparatus distributes a processing rule received from an application to a processing server. The distribution system includes a processing rule distribution recording unit for recording, for each of the processing servers, an event condition contained at least in the processing rule among those distributed as above. The event processing distribution control unit refers to the processing rule distribution recording unit at reception of a new processing rule, and assigns the new processing rule to one of the processing servers which is assigned with processing rules and of which the number of processing rules is within a predetermined range relative to a minimum value of the numbers of the processing rules respectively assigned to the processing servers, the processing server having an event condition substantially equal to an event condition of the new processing rule.

According to the event processing distribution control apparatus of a 14th aspect of the present invention, in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

In the event processing distribution control apparatus of a 15th aspect of the present invention, in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

According to a 16th aspect of the present, there is provided an event processing distribution control apparatus for use in a load distribution system including a plurality of processing servers for notifying a result of processing of an event to a plurality of applications and a context-dependent distributing unit for distributing events occurring in terminals to the plural processing servers. The control apparatus distributes a processing rule received from an application to a processing server. The load distribution system includes weight coefficients for each of the processing rules and a processing rule distribution recording unit for recording, for each of the processing servers, an event condition contained at least in the processing rule among those distributed above. The control apparatus refers to the processing rule distribution recording unit at reception of a new processing rule, and assigns the new processing rule to one of the processing servers which is assigned with processing rules and of which a sum of the weight coefficient is within a predetermined range relative to a minimum value of the sums of the weight coefficients of the numbers of the processing rules respectively assigned to the processing servers, the processing server having an event condition substantially equal to an event condition of the new processing rule.

In the event processing distribution control apparatus according to a 17th aspect of the present invention, in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

In the event processing distribution control apparatus according to a 18th aspect of the present invention, in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

In accordance with to a 19th aspect of the present, there is provided an event processing distribution control program for use in a load distribution system comprising a plurality of processing servers for notifying a result of processing of an event to a plurality of applications and a context-dependent distributing unit for distributing events occurring in terminals to the plural processing servers. The control program distributes a processing rule received from an application to a processing server. The program includes the steps of recording by a processing rule distribution recording unit, for each of the processing servers, an event condition contained at least in the processing rule among those distributed as above, and referring by the event processing distribution control unit to the processing rule distribution recording unit at reception of a new processing rule, and assigns the new processing rule to one of the processing servers which is assigned with processing rules and of which the number of processing rules is within a predetermined range relative to a minimum value of the numbers of the processing rules respectively assigned to the processing servers, the processing server having an event condition substantially equal to an event condition of the new processing rule.

According to a 20th aspect of the present invention, the event processing distribution control program further includes the step of, in the absence of the processing server having an event condition substantially equal to an event condition of the new processing rule, if part of an event condition beforehand assigned to a particular one of the processing servers matches the event condition of the new processing rule, assigning the new processing rule to the particular processing server.

According to a 21st aspect of the present invention, the event processing distribution control program further includes the step of, in the absence of the processing server having an event condition substantially equal to an event condition of the new processing rule, if part of the event condition of the new processing rule matches an event condition beforehand assigned to a particular one of the processing servers, assigning the new processing rule to the particular processing server.

In accordance with a 22nd aspect of the present invention, there is provided an event processing distribution control program for use in a load distribution system comprising a plurality of processing servers for notifying a result of processing of an event to a plurality of applications and a context-dependent distributing unit for distributing events occurring in terminals to the plural processing servers. The control program distributes a processing rule received from an application to a processing server. The control program includes the steps of disposing weight coefficients for each of the processing rules, recording by a processing rule distribution recording unit, for each of the processing servers, an event condition contained at least in the processing rule among those distributed above, referring by the control apparatus to the processing rule distribution recording unit at reception of a new processing rule, and assigning the new processing rule to one of the processing servers which is assigned with processing rules and of which a sum of the weight coefficient is within a predetermined range relative to a minimum value of the sums of the weight coefficients of the numbers of the processing rules respectively assigned to the processing servers, the processing server having an event condition substantially equal to an event condition of the new processing rule.

The event processing distribution control program in accordance with a 23rd aspect of the present invention further includes the step of, in the absence of the processing server having an event condition substantially equal to an event condition of the new processing rule, if part of an event condition beforehand assigned to a particular one of the processing servers matches the event condition of the new processing rule, assigning the new processing rule to the particular processing server.

The event processing distribution control program in accordance with a 24th aspect of the present invention further includes the step of, in the absence of the processing server having an event condition substantially equal to an event condition of the new processing rule, if part of the event condition of the new processing rule matches an event condition beforehand assigned to a particular one of the processing servers, assigning the new processing rule to the particular processing server.

In accordance with the present invention, a plurality of processing servers is installed and a context-dependent distributor is arranged in a stage before the processing servers. To the respective processing servers, an event processing distribution controller sets individual processing rules. A distribution rule is set to the context-dependent distributor to appropriately distribute events required for each processing server to execute the processing rule set thereto. It is therefore possible to implement the load distribution for processing servers even in an environment in which the processing servers execute mutually different event processing and require mutually different events.

BRIEF DESCRIPTION OF THE DRAWINGS

The objects and features of the present invention will become more apparent from the consideration of the following detailed description taken in conjunction with the accompanying drawings in which:

FIG. 8 is a program listing showing an example of processing rules;

FIG. 9 is part of a program showing an example of processing rule distribution records;

FIG. 12 is part of a program showing an example of an event;

FIG. 13 is a diagram showing an example of a processing rule set by a client;

FIG. 14 is part of a program showing rule distribution example 1 of a rule distribution control server;

FIG. 15 is part of a table showing event distribution rule example 1;

FIG. 16 is part of a program showing rule distribution example 2 of a rule distribution control server; and FIG. 17 is part of a table showing event distribution rule example 2.

DESCRIPTION OF THE EMBODIMENTS

Figure 1:
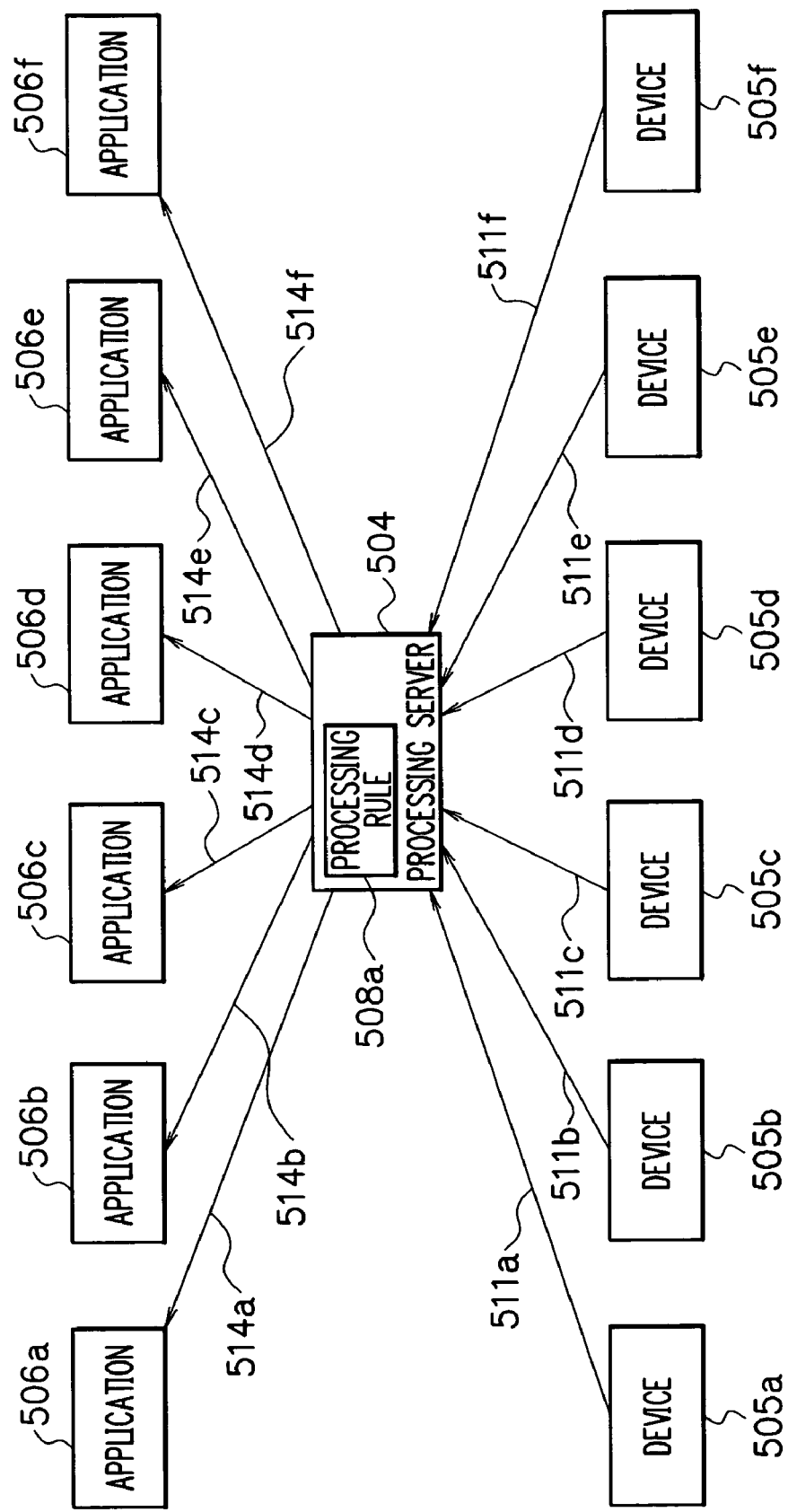
FIG. 1 is a block diagram showing a configuration of a conventional load distribution system.
Figure 2:
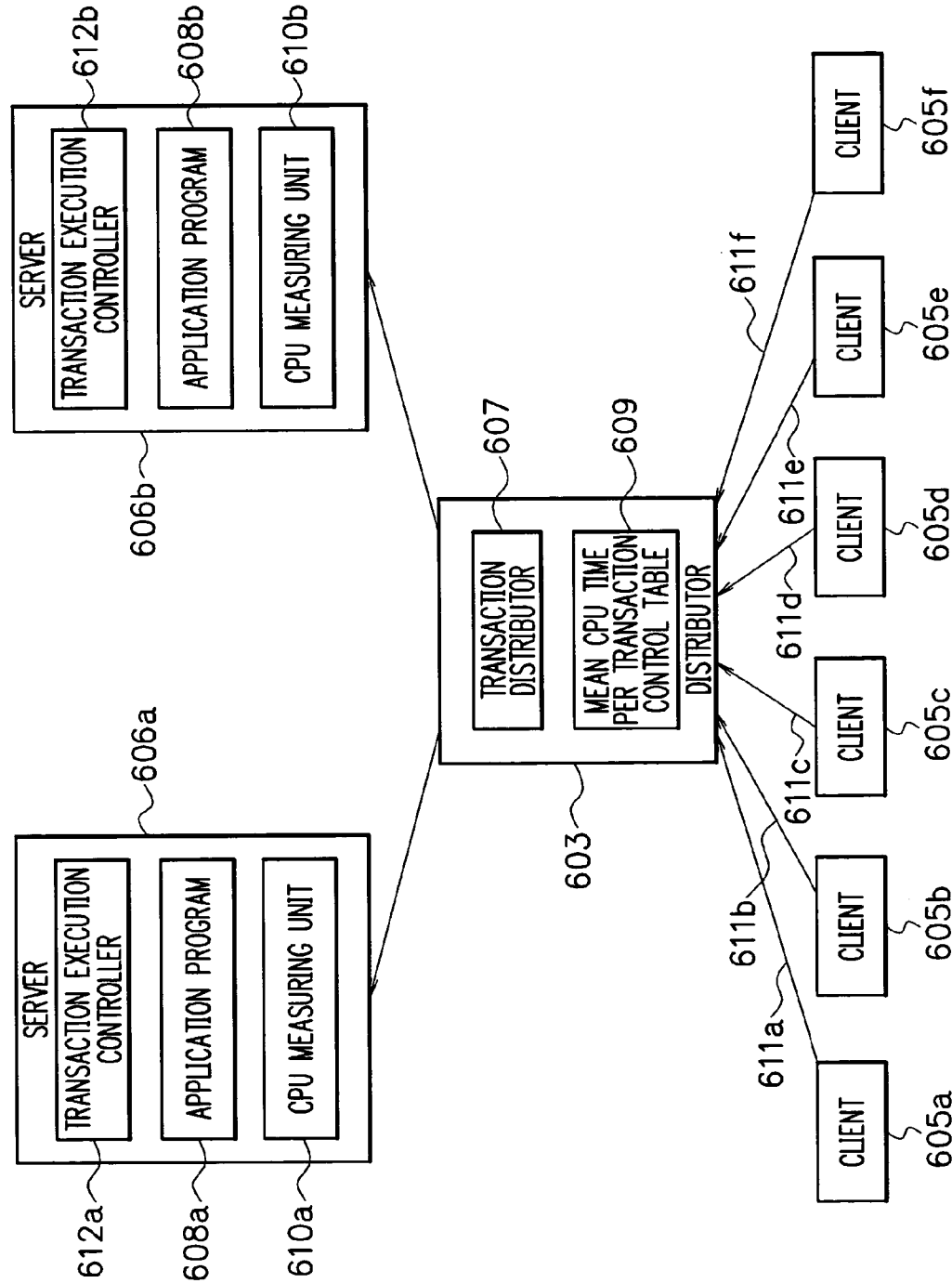
FIG. 2 is a block diagram schematically showing a configuration of a conventional load distribution system.

Description will now be given of an outline of the present invention. The load distribution system of the present invention is configured on the basis of a system in which an application issues to the system a request as a processing rule, that is, processing of information of an occurrence or an event from a device such as an Radio Frequency IDentifier (RFID) or a sensor. According to the rule, the system executes processing using context of the event and sends a result of the processing to the application. The processing rule includes constituent items for the system to execute processing on the basis of content of an event.

To disperse processing in a system of this type, a plurality of processing servers are disposed, and an event processing distribution control unit sets event processing rules to the respective processing servers for individual applications, respectively. The distribution controller sets a distribution rule associated with context of an event to a distributor so that the event is distributed to an associated server that is beforehand specified to process the event. As a result, the load distribution can be accomplished for the processing servers.

In a stage preceding a context-dependent distributor 103 to distribute an event to an appropriate processing server according to context of the event, there is arranged a context-independent distributor distributing at random an event to a processing server irrespectively of context thereof. Specifically, in a stage succeeding the context-independent distributor, a plurality of context-dependent distributors 103 including the mutually same distribution rules are disposed.

The context-independent distributor distributes each of events from devices at random to the context-dependent distributors 103. The event is delivered therefrom to an appropriate processing server according to context thereof. Like in the system including one context-dependent distributor 103, the events can be distributed to achieve the load distribution in this system. The load imposed on the context-dependent distributors 103 can also be dispersed.

Referring now to the drawings, description will be given of an embodiment of the present invention.

The load distribution system includes an event processing distribution controller 101, a context-dependent distributor 103, and a plurality of processing servers 104a to 104f. The distributor 103 is connected to a plurality of devices 105a to 105f such as RFID readers and sensors. The servers 104a to 104f are connected to a plurality of applications 106a to 106h.

It is not necessarily required that the processing servers, the devices, and the applications are equal in the number to each other. For example, one processing server, e.g., the processing server 104a may correspond to a plurality of applications 106a and 106b. When a plurality of event processing requests are issued to the system, one application such as the application 106b may correspond to a plurality of processing servers 104a and 104b.

The context-dependent distributor 103 includes a distribution rule 107 indicating event distribution. The processing servers 104a to 104f respectively include processing rules 108a to 108f indicating event processing methods. The event processing distribution controller 101 supplies the information items as designated by arrows 109 and 110a to 110f.

First Embodiment

Figure 3:
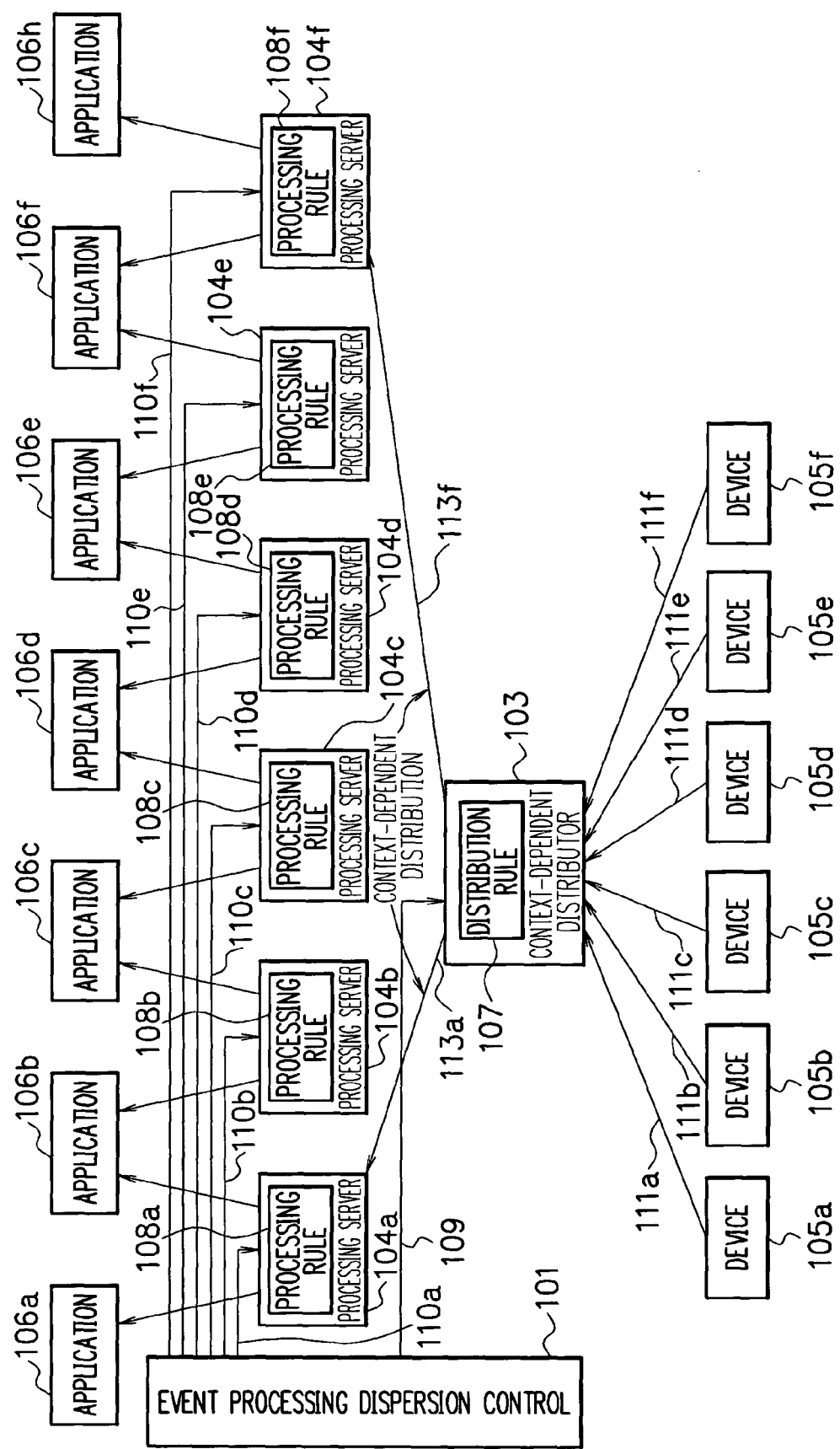
FIG. 3 is a schematic block diagram showing a configuration of a first embodiment of a load distribution system.

Referring next to FIG. 3, description will be given of processing in the first embodiment of a load distribution system.

The event processing distribution controller 101 sets the processing rules 108a to 108f of event processing requested by the applications 106a to 106f to the processing servers 104a to 104f as indicated by arrows 110a to 110f.

The processing rules 108a to 108f of event processing are set in, for example, an RFID system as below. If the application 106a desires notification at detection of an event that all RFIDs of all members required to produce an item are detected, the application 106a sets a rule "if all RFIDs of all members have been detected, notify the condition to the application" to the processing rule 108a of the processing server 104a as denoted by an arrow 110a.

The event processing distribution control module 101 then sets a distribution rule 107 to the context-dependent distributor 103 (arrow 109) so that events are distributed to the processing servers 104a to 104f which are designated to process the respective events according to the processing rules 108a to 108f, respectively. In the above example, the rule is, for example, "an event of detection of an RFID of a member for the product is transferred to the processing server 104a".

The context-dependent distributor 103 receives the events 111a to 111f taking place respectively in the devices 105a to 105f. The distributor 103 refers to context of each of the received events to feed the event to an appropriate one of the servers 104a to 104f according to the distribution rule 107 (arrows 113a to 113f).

Having received the event (113a to 113f) from the distributor 103, the associated processing server delivers the event to associated applications (106a to 106h) according to the distribution rule 107.

Second Embodiment

Figure 4:
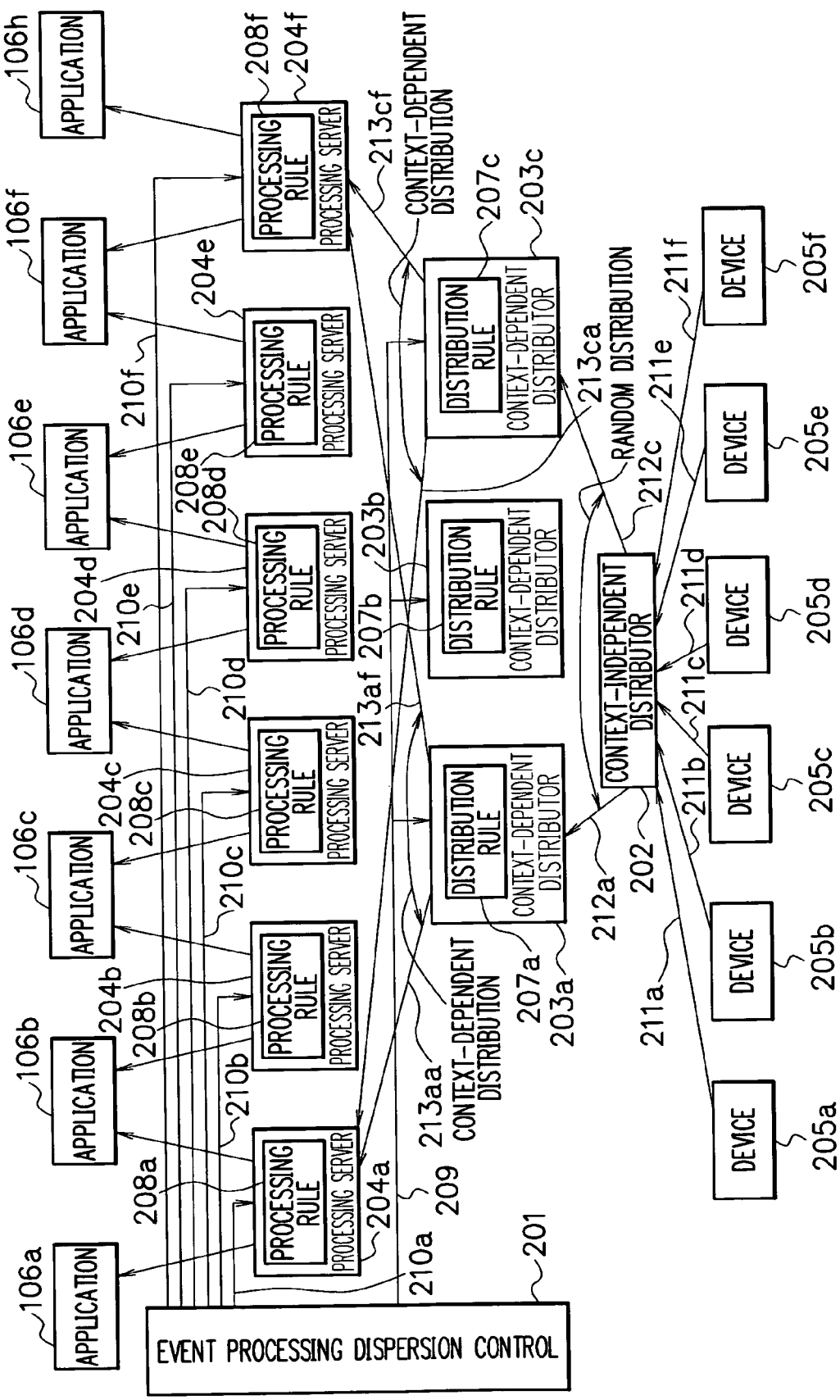
FIG. 4 is a block diagram showing a configuration of a second embodiment of a load distribution system.
Figure 5:
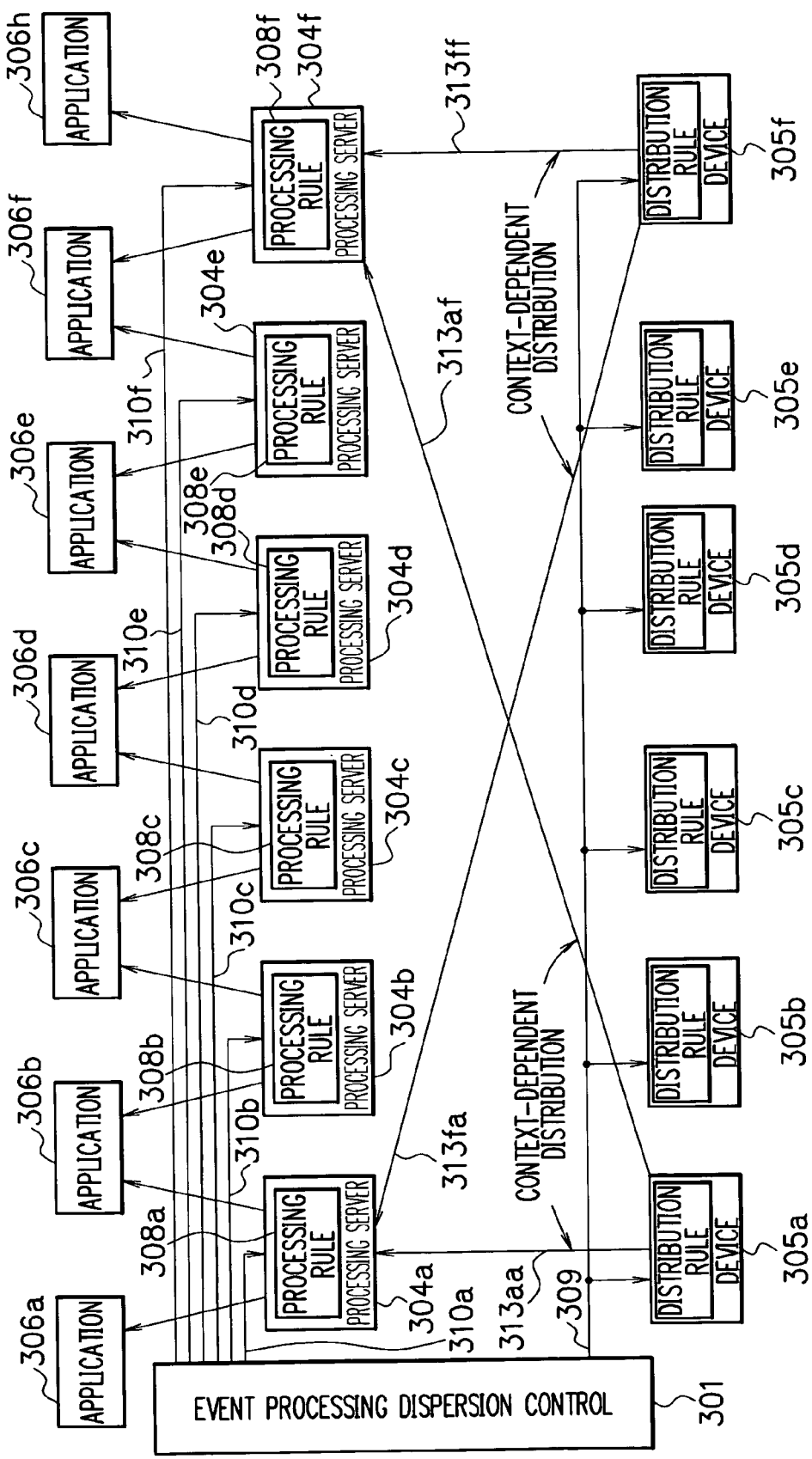
FIG. 5 is a block diagram schematically showing a configuration of a third embodiment of a load distribution system.
Figure 6:
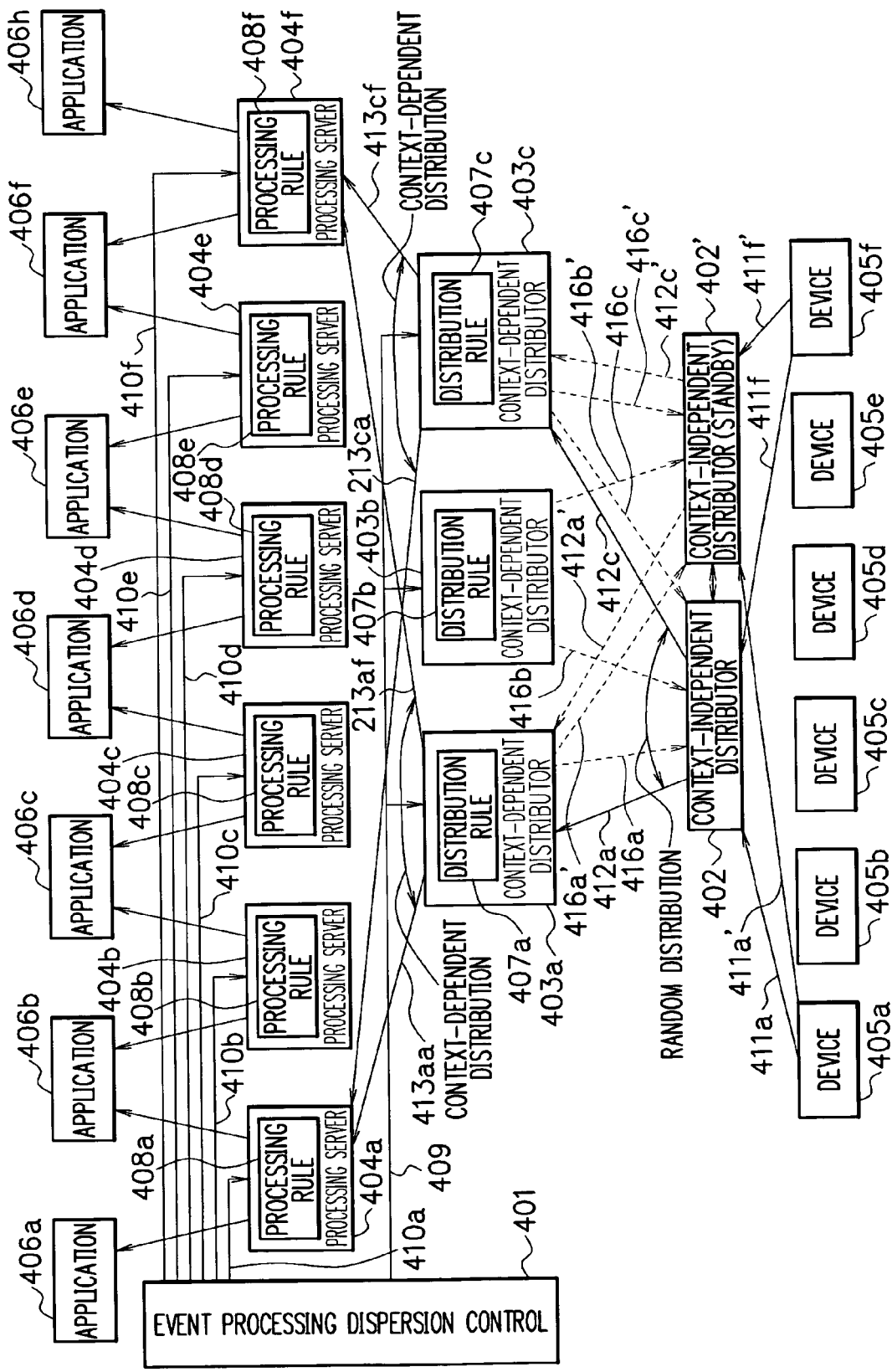
FIG. 6 is a schematic block diagram showing a configuration of a fourth embodiment of a load distribution system.

Next, the second embodiment will be described by referring to FIG. 4.

In the second embodiment, a plurality of context-dependent distributor 103 (203) are arranged. In a stage preceding the distributors 203, there are disposed a context-independent distributors 202 which randomly distribute events to the context-dependent distributors 203 without referring to context of the events (arrows 212a to 212c). Distribution rules 207a to 207c set by the event processing distribution controller 201 to the distributors 203a to 203c are substantially equal to each other. The contents and procedures of the rules are substantially the same as those of the first embodiment.

In the system including a plurality of processing servers and a context-dependent distributor 103 to distribute the load of the servers, there exists a problem that since the distributor 103 refers to context of each event for the distribution thereof, load of processing of the distributor 103 increases. However, as can be seen from FIG. 4, when a context-independent distributor which randomly distributes events without referring to context thereof through a smaller amount of processing steps is arranged in the stage before a plurality of context-dependent distributors 103, it is possible to achieve the load distribution among the context-dependent distributors 103.

Third Embodiment

In the third embodiment, the distribution rule 107 of the context-dependent distributor 103 employed in the first embodiment is installed in each of the devices 305a to 305f. When one of the devices 305a to 305f detects an event, it is possible to autonomously carry out context-dependent event distribution 313aa to 313af. Resultantly, the load of context-dependent distribution of events can be dispersed to the devices without using the context-dependent distributor 103.

Fourth Embodiment

The fourth embodiment is an example in which a failure avoiding function is installed in the context-independent distributors and the context-dependent distributors 103 of the second embodiment.

Two context-independent distributors 402 and 402' are implemented in a duplicated system. Devices 405a to 405f notify respective events 411a and 411a' (411b and 411b', 411c and 411c', 411d and 411d', and 411f and 411f') to context-independent distributors 402 and 402', respectively. Or, each of the devices 405a to 405f may transfer only one event packet so that the context-independent distributors 402 and 402' receive the packets.

The distributors 402 and 402' mutually conduct failure confirmation 415. Ordinarily, only the distributor 402 accomplishes the event distribution 412a to 412c. The distributor 402' does not carry out the distribution. However, when the distributor 402' detects through the failure confirmation 415 occurrence of failure in the distributor 402, the distributor 402' starts the event distribution 412a' to 412c'. This makes it possible to avoid failure in the context-independent distributor system (402 and 402').

The context-dependent distributors 403a to 403c send living state notification 416a and 416a' (416b and 416b' and 416c and 416c') thereof to the context-independent distributors 402 and 402', respectively. The distributors 402 and 402' respectively conduct the event distribution 412a to 412c and 412a' to 412c' only for the living one of the context-dependent distributors 403a to 403c. For the non-living context-dependent distributor, the event distribution is not conducted to thereby avoid failure of the context-dependent distributor module (403*a* to 403*c*).

Fifth Embodiment

In the first embodiment, one processing server executes one associated processing rule. That is, when the number of applications increases, the number of processing rules to be processed by one processing server becomes larger. In this configuration, if processing rules are assigned to be concentrated onto a particular processing server, there arises a problem of increase in the processing load of the processing server.

One of the methods to solve this problem is assigning one processing rule to a plurality of processing servers. The method is effective in "state-less" processing of which the processing rule is independent of a history of processing. However, if the processing rule is "stateful" processing which is dependent on the processing history, there possibly occurs necessity to dispose a common memory accessible from a plurality of processing servers such that the processing servers processing the same processing rule refer to and update the common memory to thereby apply the processing rule. In this method, exclusive control is required for the communication with the common memory and between the processing servers. This becomes a bottleneck of processing and leads to a fear of deterioration in the overall processing performance. As a result, particularly, in a large-sized system, it is effective to adopt a rule that one processing server processes one associated processing rule.

Figure 7:
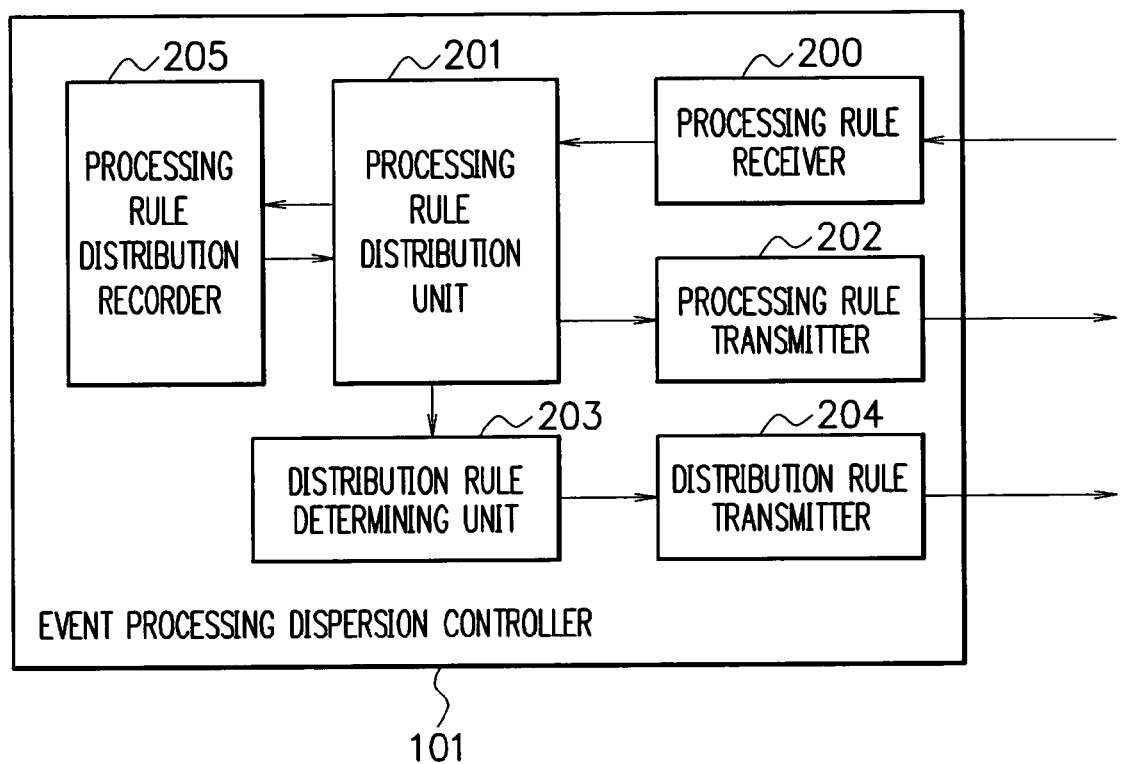
FIG. 7 is a block diagram showing structure of an event processing distribution controller.

FIG. 7 shows a configuration of the event processing distribution controller 101.

The control unit 101 includes a processing rule receiving module 200 to receive processing rules from the applications 106*a* to 106*h*, a processing rule distribution unit 201 to determine assignment of each processing rule to a processing server, a processing rule transmitter unit 202 to transmit a processing rule to a processing server, a distribution rule generator unit 203 to create a distribution rule for distribution of a processing rule to a processing server, a distribution rule transmission module 204 to send a distribution rule to a context-dependent distributor 103, and a processing rule distribution recorder unit 205 to record, for each processing server, distribution of an associated processing rule.

FIG. 8 shows an example of a processing rule. The example includes a name of a processing rule, a condition of an event to be processed (event condition), and description of processing for the event. Line 0001 indicates a name of the processing rule. Line 0002 is a condition of an event to which the processing rule is applied. That is, an event includes a field "tag_kind" indicating a kind of an RFID, and if the field contains a value of four, the processing rule is applied. For example, if the event is represented by "event(tag_kind, TagID)", the processing is executed for each event associated with "TagID" of "tag_kind=4". Line 3 and subsequent lines are the contents of the processing. Line 0004 is processing at initialization to start the processing rule. In the description, line 0005 reserves an array storage area to save an event of "eventlog". Line 0006 indicates that an integer variable "event_count", i.e., the number of stored events is cleared to zero.

Lines 0008 to 0018 indicate processing at reception of an event. In line 0009, an event thus received is stored in "eventlog". In line 0010, "event_count" is incremented by one. Also in line 0011, if "event_count" is zero, ten events recorded in "eventlog" is sent in line 0012 to an application having set the processing rule. In line 0013, "event_count" is cleared to zero. In line 0014, an associated timer is reset or cleared.

If "event_count" is less than ten in line 0011, a value of ten seconds is set to the timer in line 0016. If an indication of time-out is received from the timer, processing of "timeout" is executed in line 0019. The resetting of the timer in line 0014 cancels this processing.

The "timeout" processing in line 0019 is processing activated, in a situation in which at least one event remains in "eventlog" for transmission thereof, when ten seconds pass after the reception of the last event. In line 0020, each event recorded in "eventlog" is delivered to an application having set the processing rule. In line 0021, "event_count" is cleared to zero. In line 0021, the timer is reset.

In short, the processing rule indicates that when ten events for which "tag_kind" is set to 4 are received or when ten seconds pass after the reception of the last event, each event stored in "eventlog" is transmitted to the application associated with the processing rule. The processing rule mitigates load of processing required to transmit an event from the processing server to the application.

The processing rule requires a recording section for "event_count" and "eventlog". According to the state thereof, the processing contents concerning an event change. That is, the processing is "stateful" processing.

FIG. 9 shows an example of information recorded in the processing rule distribution recording section 205. In the recording section 205, it is required to store at least the number of processing rules set for each processing server and an event condition of each processing rule. It is assumed in this example to record for each processing server the number of processing rules set for the server, a processing rule name, and an event condition. Identifiers EP1 to EP6 correspond to the processing servers 108*a* to 108*f*. It is assumed that 18 rules have already been registered and the event condition can be determined only by tag_kind.

The event processing distribution controller 101 receives by the processing rule receiver 200 a processing rule from an application. The receiver 200 passes the processing rule to the processing rule distribution module 201.

Figure 10:
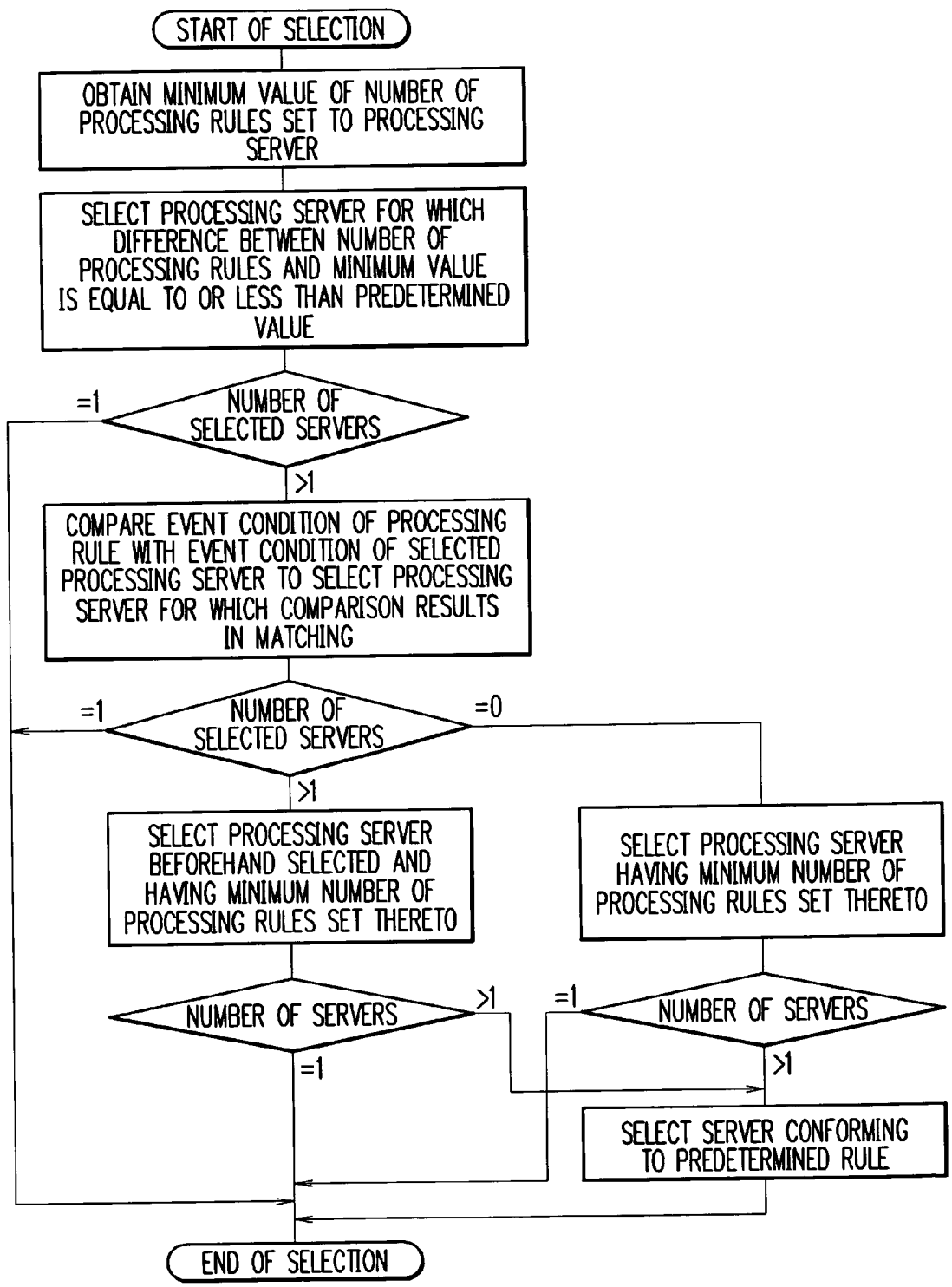
FIG. 10 is a flowchart showing a procedure of processing rule distribution.

FIG. 10 is a flowchart showing a procedure for the distribution module 201 to distribute a processing rule to a processing server.

The distributing unit 201 first obtains a minimum value of the number of rules assigned to the respective processing servers. The minimum value is "2" of EP1 and EP2 in the example of FIG. 9.

The distributor 201 selects candidates of processing servers for which the difference between the number of processing rules and the minimum value is equal to or less than a predetermined value.

If the predetermined value is "0", EP1 and EP2 are selected. If the predetermined value is "1", EP1, EP2, EP3, and EP5 are selected. It is assumed in the example that the predetermined value is "1", and hence EP1, EP2, EP3, and EP5 are selected. If there exists only one processing server as a candidate, the processing server is selected.

Subsequently, the distributor 201 compares an event condition of the processing rule with an event condition of each of EP1, EP2, EP3, and EP5.

If only one processing server has a matching event condition, the server is finally determined as a destination of distribution. Assume that, for example, the event condition is tag_kind=4. Among EP1, EP2, EP3, and EP5, only EP2 has an event condition satisfying tag_kind=4. Therefore, EP2 is determined as the distribution destination.

If a plurality of processing servers satisfy the event condition, one of the processing servers which has the smallest number of events is selected to be designated as the distribution destination. For example, if the event condition is tag_kind=4, EP2 and EP5 satisfy the condition. EP2 is less in the number of events than EP5, and hence is assumed as the distribution destination.

If none of the processing servers satisfies the event condition, one of the processing servers having the smallest number of events is specified as the distribution destination.

In some cases, a plurality of processing servers remains as candidates at the comparison with the event conditions. In this situation, one of the processing servers is determined as the destination of distribution, for example, according to serial numbers, in a random fashion, or in accordance with another appropriate rule.

At the selection of candidate servers, the processing servers are selected as candidates if the difference between the number of processing rules of each of the servers and the minimum value is equal to or less than a predetermined value. However, this does not restrict the present invention. For example, there may be employed a ratio such as "a processing server is selected as a candidate if the difference is equal to or less than 1.5 times the minimum value".

Assume that an event condition of a new processing rule is tag_kind=7. Although there do not exist the completely same event conditions, since a condition of "tag_kind=5 or tag_kind=7" includes tag_kind=7, it is also possible to assume that EP5 satisfies the condition.

On the other hand, assume that the event condition of a new processing rule is a combination of a plurality of conditions coupled with each other using "or", for example, tag_kind=3 or tag_kind=8. If there exists a processing server satisfying the event conditions, the server is selected. Otherwise, a processing server partially satisfying the event conditions is selected. For example, since tag_kind=3 of EP3 partly satisfies the conditions, EP3 is selected.

In the description, the event condition is associated with "a predetermined value of tag_kind indicating a kind of a tag (RFID)". However, the present invention is not restricted by this example. There may be adopted any condition which makes it possible for an event to be discriminated by itself. The number of processing rules assigned to each processing server is used to distribute a processing rule. However, this does not restrict the present invention. For example, it is possible to obtain a load degree by weighting the number of events matching an event condition or by weighting a degree of load of processing such that the sum of the load degrees is employed in place of the number of processing rules.

After determining the processing server to process the processing rule, the processing rule distribution module 201 registers the distribution result of the processing rule to the recording section 205 to thereby update the contents thereof. When a new processing rule appears, the distribution module 201 distributes the rule to a processing server according to the contents of the recording section 205 updated as above.

The distributor 201 then transmits by the transmission module 202 the processing rule to the processing server thus determined.

Also, the distribution unit 201 notifies the distribution result to the rule generator 203. The generator 203 creates a distribution rule including a pair of an event condition of the processing rule and the processing server and then feeds via the transmission module 204 the distribution rule to the context-dependent distributor 103.

For an event, the distributor 103 determines a processing server as a destination of the event on the basis of a plurality of distribution rules. However, in a case in which the plural distribution rules for an event are transmitted to one processing server, it is desirable that the event is not transmitted for each distribution rule, but is once transmitted such that the plural processing rules are applied on the processing server side.

If the same event condition and the same processing server are designated for a plurality of processing rules, it is also possible to configure the system such that the distribution rule is not sent to the context-dependent distributor 103.

As above, by distributing the processing rules as shown in the embodiment, it is possible to prevent an event in which the load is concentrated onto some particular processing servers. At the same time, the processing rules having the same or partially the same event conditions can be concentrated onto particular servers. Therefore, for a particular event, it is possible to reduce the number of processing servers to which the context-dependent distributor 103 delivers events. Since the number of events received by the processing servers can be reduced, the number of events received by each processing server also decreases. This advantageously increases the overall processing performance.

Sixth Embodiment

Description will now be given of a sixth embodiment to implement processing rule distribution in accordance with the present invention.

Figure 11:
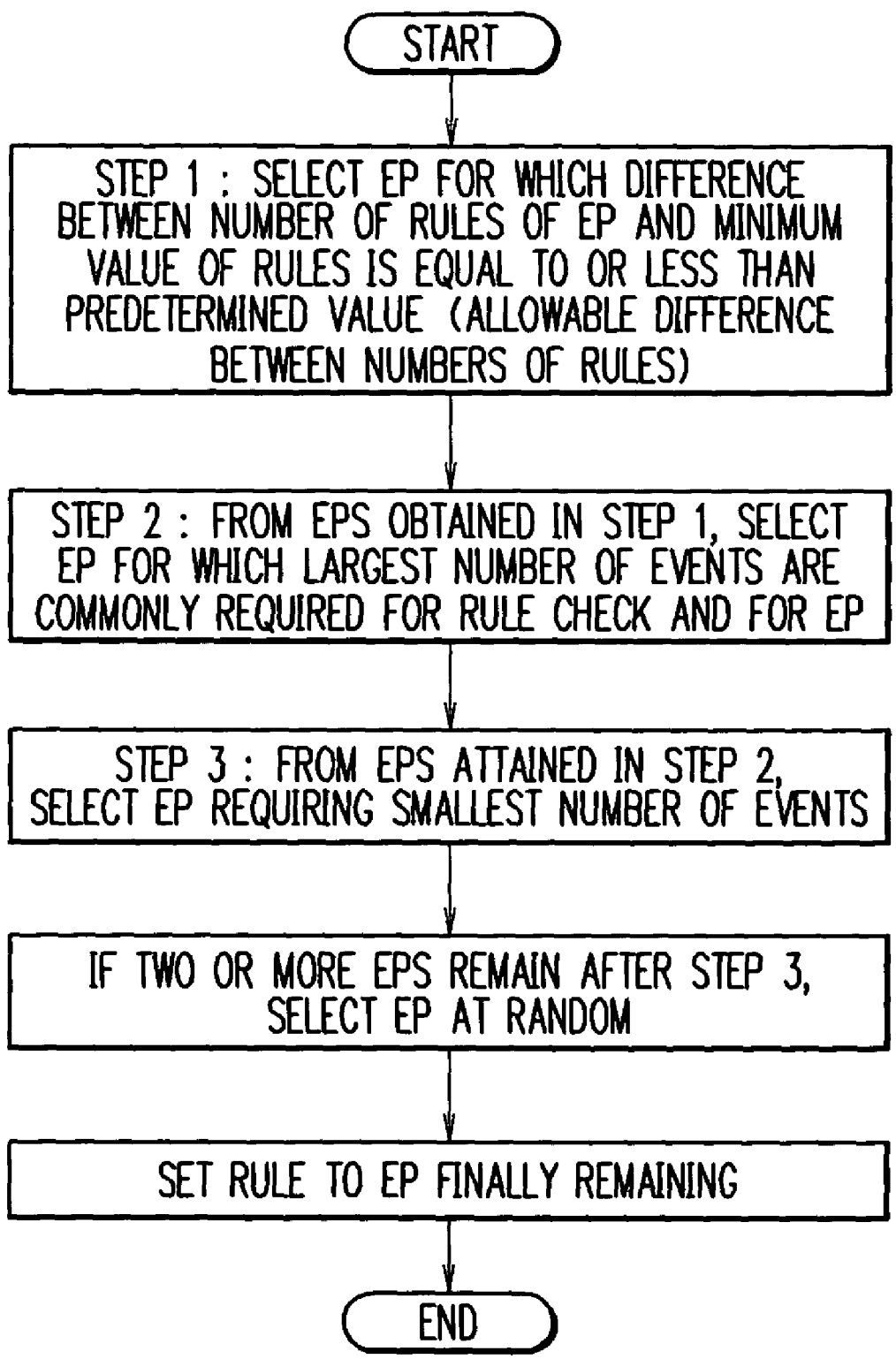
FIG. 11 is a flowchart showing a procedure of rule distribution.

FIG. 11 shows a flow of the processing rule distribution. Each time a processing rule is set by an application (106a to 106h), the processing of FIG. 11 is executed. In the flowchart shown in FIG. 11, an allowable difference between the numbers of processing rules in step 1 is a predetermined value. In either one of the steps, if the number of processing servers is one, the processing rule is set to the processing server. As a method of discriminating an event kind, there may be employed, for example, a method in which an attribute is assigned to each event to classify the events on the basis of the attribute.

The execution sequence of the steps are not necessarily fixed, but may also be changed.

Definitions of Events and Processing Rules

According to an example of events and processing rules, the processing rule distribution method will be described. In the example, the device is an RFID reader and the application is an application program handling information of an RFID notified from the RFID reader. The event includes an RFID (TagID) and an ID of a reader having acquired the RFID. FIG. 12 shows an example of the event in which TagID is "10" and ReaderID is "20".

FIG. 13 shows an example of processing rules designated by the application.

Assume that the rules ranging from Rule_A1 to Rule_A6 have been sequentially specified. In each processing rule description, the left-hand side indicates conditions, and the right-hand side, or the last item designates operations. The condition field includes two events indicating that if occurrence of two events described in the field is received from devices, the condition is satisfied. For example, the condition of Rule_A1, i.e., Event(TagID=10,ReaderID=20)& Event(TagID=11,ReaderID=20) designates that if both an event of TagID=10,ReaderID=20 and an event of TagID=11,ReaderID=20 occur, the operation of the processing rule is activated. In this situation, both of the events are required to be processed. That is, these events are distributed to a processing server assigned with the processing rule.

The operation field "notify to Application_A" indicates that the event of the matching condition is to be notified to Application_A. In this connection, Application_A corresponds to the application 106a and Application_B corresponds to application 106b. This also applies to the other applications.

Processing Distribution Rule Example 1

Assume that there exist three processing servers and the allowable difference between processing rules is two. The event processing distribution controller distributes the processing rules of FIG. 14 as shown in FIG. 13.

The processing flow will now be described. Assume that three processing servers are EP1, EP2, and EP3; an event required to check a condition of a processing rule is referred to as a processing rule check event, and a set of events which are designated for a processing server and which are required to check processing rules are collectively called a processing server essential event.

When the application 106a sets Rule_A1, since no rule has been specified for any processing server in the initial state, all processing servers are selected in step 1.

Control goes to step 2. Events required to check a processing rule are Event(TagID=10,ReaderID=20) and Event (TagID=11,ReaderID=20). Since no processing rule has been set to any processing server, there does not exists an event required for the processing rule check. Therefore, the number of events commonly required, namely, the numbers of events required by the respective processing servers are substantially equal to each other and hence all processing servers are selected. Control goes to step 3.

In step 3, since no processing rule has been specified for any processing server, the number of events required as above is zero for each processing server. Therefore, all processing servers are selected. Finally, a processing server to which the processing is distributed is randomly selected. Assume that EP2 is selected.

When the application 106b sets Rule_A2, all processing servers are selected in step 1 since difference between the number of processing rules designated for each processing server is equal to or less than the allowable difference "two". The process goes to step 2. Events required to check a processing rule are Event(TagID=10,ReaderID=20) and Event (TagID=11,ReaderID=20). Events necessary for EP2 are Event(TagID=10,ReaderID=20) and Event(TagID=11,ReaderID=20). None of the events required for the other processing servers is required for EP2. Since the two events are commonly necessary for the processing rule check and EP2, Rule_A2 is set to EP2.

When the application 106c designates Rule_A3, all processing servers are selected in step 1 since difference between the number of processing rules designated for each processing server is equal to or less than the allowable difference "two" Then the process goes to step 2. Since there exists no event commonly required for the processing rule check and the respective servers, all processing servers are selected in step 2 and the process advances to step 3. Since EP2 requires two events and the other processing servers do not require any event, EP1 and EP3 are selected. Finally, either one of EP1 and EP3 is selected at random. Rule_A3 is set to the selected processing server. Assume that EP1 is selected.

When the application 106c sets Rule_A4, since the number of processing rules designated for each processing server is equal to or less than the allowable difference "two", all processing servers are selected in step 1 and then the process goes to step 2. Since Event(TagID=11,ReaderID=20) is commonly required for the processing rule check and the respective servers and no event is commonly required for the processing check and the other processing servers, Rule_A4 is set to EP2.

When the application 106a designates Rule_A5, since the number of processing rules specified for EP2 is greater than that of EP3 by the allowable difference of processing rules "2", EP2 is excluded and EP1 and EP3 are selected in step 1 and then the process goes to step 2. Since no event is commonly required for the processing check and the respective processing servers, all processing servers are selected and control proceeds to step 3. EP1 requires two processing rules and EP3 requires no processing rule. Therefore, Rule_A5 is set to EP3.

When the application 106b specifies Rule_A6, since deifference between the number of processing rules set to each processing server is equal to or less than the allowable difference "2", all processing servers are selected in step 1 and then control goes to step 2. No event is commonly required for the processing rule check and EP1 and one event is required for the processing rule check and the other processing servers. Therefore, EP2 and EP3 are selected and the process goes to step 3. Since EP2 requires three events and EP3 requires two events, and hence Rule_A6 is set to EP3.

When the processing rule is distributed as shown in FIG. 13, the event distribution processing rule of FIG. 15 is set to the context-dependent distributor 103. Each entry of the table shown in FIG. 15 indicates a relationship between a condition of an event and a transfer destination processing server of the event satisfying the condition. For example, Event (TagID=10,ReaderID=20) is delivered to EP2 and Event (TagID=13,ReaderID=25) is transferred to EP2 and EP3.

Processing Rule Distribution Example 2

In the example described above, the processing rule is distributed according to all attributes of events specified in the condition of the processing rule. However, the distribution may also be carried out on the basis of part of the attributes of the events designated in the processing rule condition. Description will now be given of a flow of processing rule distribution using TagID as an attribute for the distribution. FIG. 16 shows distribution of the processing rules shown in FIG. 14 on the basis of TagID. In the following description, if an asterisk is designated as a value of the attribute, it is assumed that the attribute takes an arbitrary value.

When the application 106a sets Rule_A1, since no processing rule is set to any processing server in the initial state, all processing servers are selected in step 1. The process goes to step 2. The event necessary for the processing check is Event (TagID=11,ReaderID=*). Since no processing rule is set to any processing server, no event is required. Therefore, the numbers of events commonly required for the processing servers are equal to each other and hence all processing servers are selected. The process transfers to step 3. Since no processing rule is set to any processing server, the number of events commonly required for the processing servers is zero, and hence all processing servers are selected. Finally, the processing server to which the processing rule is distributed is randomly selected. Assume that EP2 is selected.

When the application 106b sets Rule_A2, since difference between the number of processing rules designated for each processing server is equal to or less than the allowable difference "two", all processing servers are selected in step 1. Control goes to step 2. The processing rule check requires Event(TagID=10,ReaderID=*) and Event(TagID=11,ReaderID=*). EP2 requires Event(TagID=10,ReaderID=*) and Event(TagID=11,ReaderID=*). No event is required for the other processing servers. The processing rule check and EP2 commonly require the two events. Therefore, Rule_A2 is set to EP2.

When the application 106c sets Rule_A3, since the number of processing rules designated for each processing server is equal to or less than the allowable difference "two", all processing servers are selected in step 1. The process goes to step 2. The processing rule check requires Event(TagID=11,ReaderID=*) and Event(TagID=12,ReaderID=*). The processing rule check and EP2 commonly require one event. Therefore, Rule_A3 is set to EP2.

When the application 106c sets Rule_A4, since the difference between the number of processing rules set to EP2 and that set for each of the other processing servers is more than the allowable difference between processing rules "2", E1 and E3 are selected in step 1. Control goes to step 2. Since no event is commonly required by the processing rule check and the processing servers, all processing servers are selected. The process goes to step 3. Since there exists no event required by the processing servers, all processing servers are selected. Finally, EP1 or EP3 is randomly selected. Assume that EP1 is selected.

When the application 106a sets Rule_A5, since the difference between the number of processing rules set to EP2 and that set to EP3 is more than the allowable difference between processing rules "two", EP1 and EP3 are selected. The process goes to step 2. Since there exists no event commonly required by the processing rule check and the processing servers, all processing servers are selected. Control goes to step 3. EP1 requires two events and EP3 requires no event. Therefore, Rule_A5 is set to EP3.

When the application 106b sets Rule_A6, since the number of processing rules designated for each processing server is equal to or less than the allowable difference "two", all processing servers are selected in step 1 and then control goes to step 2. No event is commonly required for the processing rule check and EP2 and one event is required for the processing rule check and the other processing servers. Therefore, EP1 and EP3 are selected and the process goes to step 3. Since EP1 and EP3 commonly require two events, the target server is randomly selected. Rule_A6 is set to the selected server. Assume that EP3 is selected. FIG. 16 shows the processing rule distribution result in this situation.

For the processing rule distribution of FIG. 16, the event distribution processing rules are set to the context-dependent distribution module 103 as shown in FIG. 17. The contents of FIG. 17 are similar to those of FIG. 15.

Due to the above configuration, even if the events occur more often from the devices and event data is more frequently accessed to be updated, the conventional bottleneck problem taking place in association with shared event data can be avoided.

By use of the rule distribution method, the event copy operations can be reduced to the maximum extent in the context-dependent distribution module 103 to thereby efficiently use the system resources.

Description has been given of rule distribution examples 1 and 2. In example 1, the context-dependent distributor 103 more strictly narrows the range of events to be selected. Consequently, each processing server needs to process only the minimum amount of events. According to example 2, it is necessary for the controller 103 to access or to refer to only one attribute in the rule distribution. This makes it possible to increase the processing speed when compared with the case in which all attributes are accessed for the distribution.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A load distribution system, comprising:
a plurality of processing servers for notifying a result of processing of an event to a plurality of applications;
context-dependent distributing section for distributing events occurring in terminals to the plural processing servers,
wherein the context-dependent distributing section distributes an event based on content of the event as a context of the event; and
event processing distribution control section for individually setting processing rules to the plural processing servers and setting a distribution rule to the context-dependent distributing section, the distributing section thereby appropriately distributing events required to execute the processing rules,
the event processing distribution control section setting the processing rule of the event processing required by an application to the associated processing server, the processing rule including an event condition specifying content of an event associated with an operation for the event, each of the processing rules set in the associated processing servers being different respectively,
the event processing distribution control section setting a distribution rule to the context-dependent distributing section, the distribution rule including content of an event associated with information showing the processing server which has the processing rule including an event condition specifying the content of the event, the event including the content being distributed to the associated processing server according to the distribution rule,
wherein the plurality of processing servers, context-dependent distributing section, and event processing distribution control section are implemented by a processor.

2. The load distribution system in accordance with claim 1, further comprising context-independent distributing section for randomly distributing events occurring in the terminals to the context-dependent distributing section,
the context-independent distributing section distributing the events to the context-dependent distributing section without referring to context of the events.

3. The load distribution system in accordance with claim 1, wherein each of the terminals includes a distribution rule set by the event processing distribution control section, the terminal distributing events occurring therein to the processing servers according to the distribution rule.

4. The load distribution system in accordance with claim 1, comprising a plurality of units of the context-independent distributing section of which at least one context-independent distributing section conducting event distribution to distribute events,
the context-independent distributing section mutually confirming failure of each other,
the context-independent distributing section conducting the event distribution being replaced, if failure is detected therein, by another context-independent distributing section.

5. The load distribution system in accordance with claim 1, comprising a plurality of units of the context-dependent distributing section,
the context-dependent distributing section mutually confirming failure of each other.

6. The load distribution system in accordance with claim 5, wherein by notifying confirmation of failure to context-independent distributing section, the context-independent distributing section do not distribute an event to the context-dependent distributing section in which failure has occurred.

7. The load distribution system in accordance with claim 1, wherein the event processing distribution control section includes processing rule distribution recording section for recording, for each of the processing servers, an event condition contained at least in the processing rule among those distributed as above,
the event processing distribution control section referring to the processing rule distribution recording section at reception of a new processing rule, and assigning the new processing rule to one of the processing servers which is assigned with processing rules and of which the number of processing rules is within a predetermined range relative to a minimum value of the numbers of the processing rules respectively assigned to the processing servers, the processing server having an event condition substantially equal to an event condition of the new processing rule.

8. The load distribution system in accordance with claim 7, wherein in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

9. The load distribution system in accordance with claim 7, wherein in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

10. The load distribution system in accordance with claim 1, further comprising weight coefficients for each of the processing rules, wherein the event processing distribution control section includes processing rule distribution recording section for recording, for each of the processing servers, an event condition contained at least in the processing rule among those distributed above,
the event processing distribution control section referring to the processing rule distribution recording section at reception of a new processing rule, and assigning the new processing rule to one of the processing servers which is assigned with processing rules and of which a sum of the weight coefficient is within a predetermined range relative to a minimum value of the sums of the weight coefficients of the numbers of the processing rules respectively assigned to the processing servers, the processing server having an event condition substantially equal to an event condition of the new processing rule.

11. The load distribution system in accordance with claim 10, wherein in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

12. The load distribution system in accordance with claim 11, wherein in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

13. An event processing distribution control apparatus for use in a load distribution system comprising a plurality of processing servers for notifying a result of processing of an event to a plurality of applications and context-dependent distributing section for distributing events occurring in terminals to the plural processing servers, the control apparatus distributing a processing rule received from an application to a processing server, comprising
processing rule distribution recording section for recording, for each of the processing servers, an event condition contained at least in the processing rule among those distributed as above, the processing rule including the event condition specifying content of an event associated with an operation for the event, each of the processing rules set in the associated processing servers being different respectively,
wherein the control apparatus sets a distribution rule to the context-dependent distributing section, the distribution rule including content of an event associated with information showing the processing server which has the processing rule including an event condition specifying the content of the event, the event including the content being distributed to the associated processing server according to the distribution rule,
wherein the control apparatus referring to the processing rule distribution recording section at reception of a new processing rule, and assigning the new processing rule to one of the processing servers which is assigned with processing rules and of which the number of processing rules is within a predetermined range relative to a minimum value of the numbers of the processing rules respectively assigned to the processing servers, the processing server having an event condition substantially equal to an event condition of the new processing rule,
wherein the context-dependent distributing section distributes an event based on content of the event as a context of the event, and
wherein the processing distribution recording section is implemented by a processor.

14. The event processing distribution control apparatus in accordance with claim 13, wherein in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

15. The event processing distribution control apparatus in accordance with claim 13, wherein in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

16. An event processing distribution control apparatus for use in a load distribution system comprising a plurality of processing servers for notifying a result of processing of an event to a plurality of applications and context-dependent distributing section for distributing events occurring in terminals to the plural processing servers, the control apparatus distributing a processing rule received from an application to a processing server, comprising:

weight coefficients for each of the processing rules; and processing rule distribution recording section for recording, for each of the processing servers, an event condition contained at least in the processing rule among those distributed above, the processing rule including the event condition specifying content of an event associated with an operation for the event, each of the processing rules set in the associated processing servers being different respectively, wherein the control apparatus sets a distribution rule to the context-dependent distributing section, the distribution rule including content of an event associated with information showing the processing server servers which has the processing rule including an event condition specifying the content of the event, the event including the content being distributed to the associated processing server according to the distribution rule, wherein the control apparatus referring to the processing rule distribution recording section at reception of a new processing rule, and assigning the new processing rule to one of the processing servers which is assigned with processing rules and of which a sum of the weight coefficient is within a predetermined range relative to a minimum value of the sums of the weight coefficients of the numbers of the processing rules respectively assigned to the processing servers, the processing server having an event condition substantially equal to an event condition of the new processing rule, wherein the context-dependent distributing section distributes an event based on content of the event as a context of the event and wherein the processing rule distribution recording section is implemented by a processor.

17. The event processing distribution control apparatus in accordance with claim 16, wherein in the absence of the processing server having an event condition substantially equal to an event condition of the new processing rule, if part of an event condition beforehand assigned to a particular one of the processing servers matches the event condition of the new processing rule, the new processing rule is assigned to the particular processing server.

18. The event processing distribution control apparatus in accordance with claim 16, wherein in the absence of the processing server having an event condition substantially equal to an event condition of the new processing rule, if part of the event condition of the new processing rule matches an event condition beforehand assigned to a particular one of the processing servers, the new processing rule is assigned to the particular processing server.

19. An event processing distribution control program, implemented on a computer readable medium, for use in a load distribution system comprising a plurality of processing servers for notifying a result of processing of an event to a plurality of applications and context-dependent distributing section for distributing events occurring in terminals to the plural processing servers, the control program distributing a processing rule received from an application to a processing server, comprising the steps of:

recording by processing rule distribution recording section, for each of the processing servers, an event condition contained at least in the processing rule among those distributed as above, the processing rule including the event condition specifying content of an event associated with an operation for the event, each of the processing rules set in the associated processing servers being different respectively;

setting, by event processing distribution control section, a distribution rule to the context-dependent distributing section, the distribution rule including content of an event associated with information showing the processing server which has the processing rule including an event condition specifying the content of the event, the event including the content being distributed to the associated processing server according to the distribution rule; and referring by the event processing distribution control section to the processing rule distribution recording section at reception of a new processing rule, and assigning the new processing rule to one of the processing servers which is assigned with processing rules and of which the number of processing rules is within a predetermined range relative to a minimum value of the numbers of the processing rules respectively assigned to the processing servers, the processing server having an event condition substantially equal to an event condition of the new processing rule, wherein the context-dependent distributing section distributes an event based on content of the event as a context of the event.

20. The event processing distribution control program in accordance with claim 19, further comprising the step of, in the absence of the processing server having an event condition substantially equal to an event condition of the new processing rule, if part of an event condition beforehand assigned to a particular one of the processing servers matches the event condition of the new processing rule, assigning the new processing rule to the particular processing server.

21. The event processing distribution control program in accordance with claim 19, further comprising the step of, in the absence of the processing server having an event condition substantially equal to an event condition of the new processing rule, if part of the event condition of the new processing rule matches an event condition beforehand assigned to a particular one of the processing servers, assigning the new processing rule to the particular processing server.

22. An event processing distribution control program, implemented on a computer readable medium, for use in a load distribution system comprising a plurality of processing servers for notifying a result of processing of an event to a plurality of applications and context-dependent distributing section for distributing events occurring in terminals to the plural processing servers, the control program distributing a processing rule received from an application to a processing server, comprising the steps of:

disposing weight coefficients for each of the processing rules;

recording by processing rule distribution recording section, for each of the processing servers, an event condition contained at least in the processing rule among those distributed above, the processing rule including the event condition specifying content of an event associated with an operation for the event, each of the processing rules set in the associated processing servers being different respectively;

setting, by event processing distribution control section, a distribution rule to the context-dependent distributing section, the distribution rule including content of an event associated with information showing the processing server which has the processing rule including an event condition specifying the content of the event, the event including the content being distributed to the associated processing server according to the distribution rule; and referring by the event processing distribution control section to the processing rule distribution recording section at reception of a new processing rule, and assigning the new processing rule to one of the processing servers which is assigned with processing rules and of which a sum of the weight coefficient is within a predetermined range relative to a minimum value of the sums of the weight coefficients of the numbers of the processing rules respectively assigned to the processing servers, the processing server having an event condition substantially equal to an event condition of the new processing rule, wherein the context-dependent distributing section distributes an event based on content of the event as a context of the event.

23. The event processing distribution control program in accordance with claim 22, further comprising the step of, in the absence of the processing server having an event condition substantially equal to an event condition of the new processing rule, if part of an event condition beforehand assigned to a particular one of the processing servers matches the event condition of the new processing rule, assigning the new processing rule to the particular processing server.

24. The event processing distribution control program in accordance with claim 22, further comprising the step of, in the absence of the processing server having an event condition substantially equal to an event condition of the new processing rule, if part of the event condition of the new processing rule matches an event condition beforehand assigned to a particular one of the processing servers, assigning the new processing rule to the particular processing server.

25. The load distribution system in accordance with claim 1, further comprising a plurality of terminals which generate events.

* * * * *